(No Model.)
T. W. LEMIEUX.
CABLE GRIP.
No. 401,842. Patented Apr. 23, 1889.
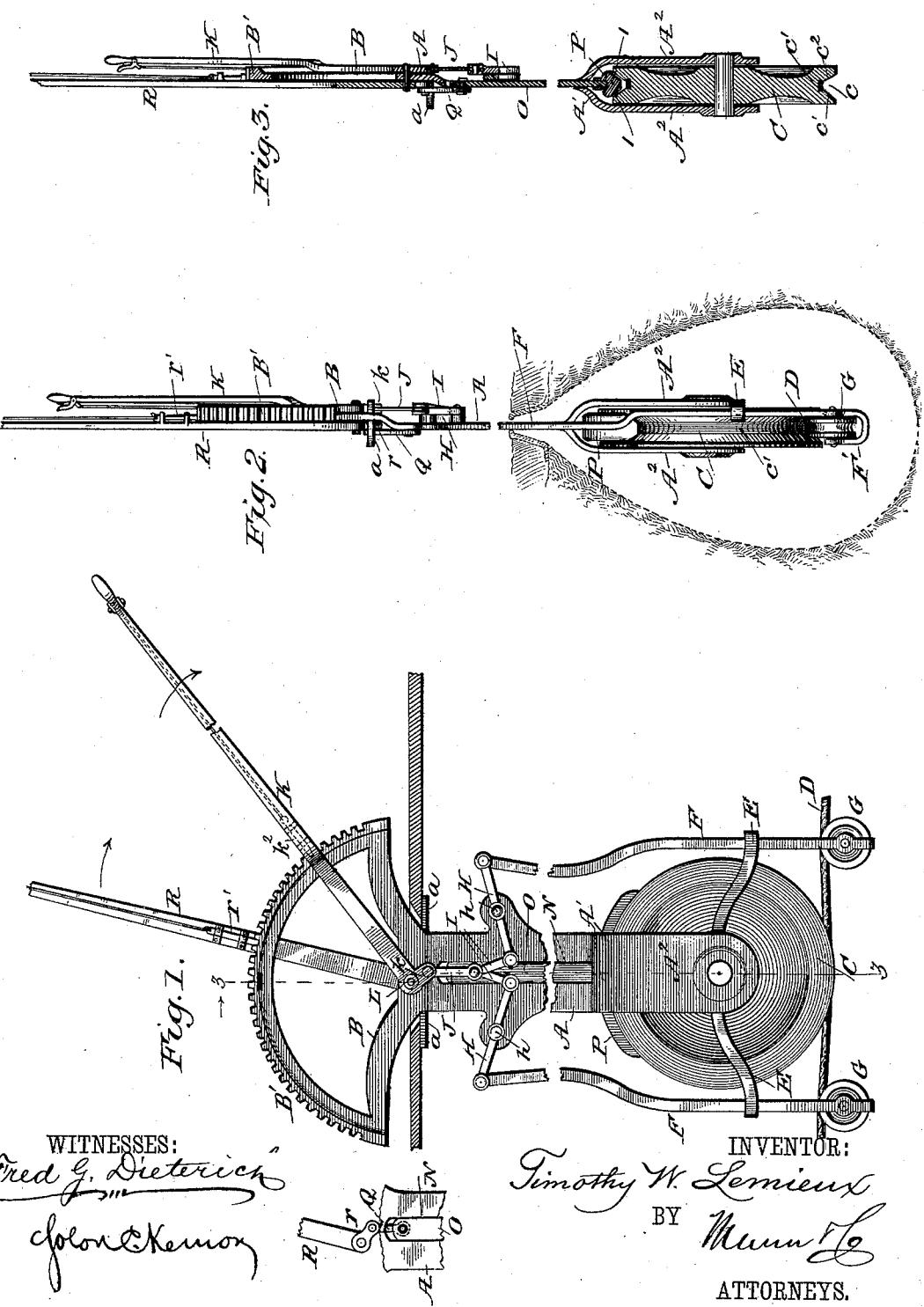
WITNESSES:
Fred G. Dieterich
Colon E. Kenion
INVENTOR:
Timothy W. Lemieux
BY Munn & Co.
ATTORNEYS.

UNITED STATES PATENT OFFICE.

TIMOTHY W. LEMIEUX, OF DULUTH, MINNESOTA.

CABLE-GRIP.

SPECIFICATION forming part of Letters Patent No. 401,842, dated April 23, 1889.

Application filed November 26, 1888. Serial No. 291,923. (No model.)

*To all whom it may concern:*

Be it known that I, TIMOTHY W. LEMIEUX, residing at Duluth, in the county of St. Louis and State of Minnesota, have invented certain new and useful Improvements in Cable-Grips, of which the following is a specification.

My invention relates to gripping devices for cable railways; and it has for its object to provide a simple, cheap, and efficient gripping device which will be easy to manipulate and positive in its operation.

To this end my invention consists in the novel construction and peculiar combination of parts, as will be hereinafter fully described in the annexed specification, and particularly pointed out in the claims, reference being had to the accompanying drawings, in which—

Figure 1 is a side elevation of my improved device. Fig. 2 is an end view thereof; and Fig. 3 is a vertical section on the line 3 3, Fig. 1.

In the practical construction of my improvement I provide a stanchion or draft-bar, A, provided near its upper end with projecting lugs or ears $a\ a$, which form a convenient means for attaching the stanchion to the car-body. The stanchion A depends from the car-body and is adapted to extend through the conduit-slot into the conduit when the gripper is used in connection with the underground-cable system. The upper end of the stanchion has formed integral therewith or secured thereto an extension, B, which projects above the car-floor and forms a quadrant, the upper peripheral edge of which is formed with a toothed rack, B', with which engage the operating-levers presently described. The lower end, A', of the stanchion is bifurcated, forming depending parallel arms $A^2\ A^2$, between which is journaled a large sheave, C, provided with an annular groove, $c$, which engages with the cable D when the gripper is in operation. One of the arms $A^2$ is provided with laterally-extending brackets E E, which form guides for vertically-movable arms F F, the lower ends of each of which are turned inwardly and upwardly, as at F', forming bearings for small sheaves G G, which support the cable D. Said arms and sheaves are arranged one forward and the other to the rear of the large sheave C, as clearly shown in Fig. 1 of the drawings.

The upper ends of the arms F F extend through the conduit-slot and are each attached to the outer ends of arms H, centrally pivoted upon studs $h$, projecting from the stanchion A. The inner ends of each of the arms H are connected by toggle-links I I J J to the short arm $k$ of a bell-crank lever, K, pivoted upon a stud, L, projecting from the base of the quadrant B. The long arm of the lever K is provided with a spring-pawl, $k^2$, which engages with the rack, as shown.

The body portion of the stanchion A is formed with a central slot, N, in which is fitted a sliding bar, O, the lower end of which is provided with a brake-shoe, P, which embraces the upper portion of the large sheave, and its upper end is connected by a pivoted link, Q, with the short arm $r$ of a hand-lever, R, which is pivoted upon the stud L. The upper end of the lever R is provided with a spring-pawl, $r'$, which engages with the rack upon the quadrant B. The levers K and R are, however, arranged upon opposite sides of the quadrant, their lower crank ends being disposed in the same direction. When it is desired to raise the cable and apply the brake, the levers are moved in the direction shown by the arrows in Fig. 1 of the drawings.

To form an efficient means of braking the sheave C without operating upon the cable-bearing groove $c$, I provide the said sheave with beveled internal flanges, $c'\ c^2$, on each side of the groove $c$ and form the shoe with beveled bearing-faces 1 1, which engage the flanges $c'\ c^2$, as clearly shown in Fig. 3.

To prevent undue friction upon the cable, I provide the groove $c$ in the sheave C with a suitable lining—preferably rubber—C'.

The operation of the device is as follows: The cable having been properly placed upon the small sheaves and under the large sheave, the gripman draws the lever K down, which movement will raise the arms F F and the sheaves G G and thereby press the cable against the lower bearing-surface of the large sheave C. The brake, not being applied, permits said sheave to turn freely upon its journals when the cable is in motion, and permits the same to travel without moving the car. The gripman then pulls the lever P down and forces the brake-shoe in contact with the beveled flanges of the sheave C and holds same from revolving, thereby causing the car to be carried in the same direction of the moving cable. By a careful adjustment of the levers K R it will be observed that the starting of the car may be gradually effected, and as there will be no slipping of the cable on the large sheave the sudden jars and jerks incident to many grips now in use will be avoided.

It will be observed that my construction of gripper is very simple, and by arranging the large sheave in connection with the two small sheaves in the manner set forth the friction upon the cable is reduced to a minimum.

From the foregoing description, taken in connection with the drawings, the operation and advantages of my improvement will be readily understood.

Having thus described my invention, what I claim, and desire to secure by Letters Patent, is—

1. The combination, with the standard A, adapted for connection with the car-body at its upper end, its lower end bifurcated, a central slot, N, formed in the standard and communicating with the bifurcated portion, and a sheave, C, journaled in the lower end of said bifurcated portion, said sheave adapted for frictional contact with the cable on its lower face, of the vertically-adjustable brake adapted to engage the upper face of the sheave C, said brake consisting of the shoe P and the sliding arm O, fitting and operating in the slot N in the standard, a lever, R, connected to said arm O at its upper end for operating it, and means, substantially as shown, for raising the cable into contact with the sheave C, substantially as and for the purpose described.

2. The combination, with the standard A, adapted for connection with the car-body at its upper end, its lower end bifurcated, a central slot, N, formed therein communicating at its lower end with the bifurcated portion, and a sheave, C, journaled in the lower end of said bifurcated portion, said wheel having an annular groove or seat to receive the cable and beveled flange to receive the brake-shoe, said wheel adapted for frictional contact with the cable, of the vertically-adjustable brake, said brake consisting of the shoe P, having beveled faces adapted to engage the flanges of the wheel C, and an upwardly-extending arm, O, fitting and sliding in the slot N in the standard, the lever R, connected to the upper end of said arm for operating it, and means, substantially as shown, for raising the cable into contact with the sheave C, substantially as and for the purpose specified.

TIMOTHY W. LEMIEUX.

Witnesses:
F. P. HERRINGTON,
S. GEO. STEVENS.